United States Patent Office 3,838,180
Patented Sept. 24, 1974

3,838,180
2-CHLOROETHYL PHOSPHONODITHIOATE ESTERS
David I. Randall and Robert W. Wynn, Easton, Pa., assignors to GAF Corporation, New York, N.Y.
No Drawing. Filed Nov. 10, 1969, Ser. No. 875,574
Int. Cl. A01n 9/36; C07f 9/40
U.S. Cl. 260—961                                   8 Claims

ABSTRACT OF THE DISCLOSURE

2-Chloroethyl phosphonodithioate esters, useful as plant growth regulators for increased fruiting are of the following formula:

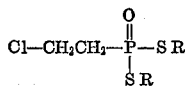

wherein R is an alkyl group of 1 to 2 carbon atoms, halo-substituted alkyl of 1 to 2 carbon atoms, aryl of 6 to 12 carbon atoms, halo-substituted aryl of 6 to 12 carbon atoms or aralkyl. The compounds are produced by the reaction of a 2-chloroethyl phosphonyl halide with a mercaptan of the formula RSH in the presence of an acid acceptor.

BACKGROUND OF THE INVENTION

Field of the Invention

This invention relates to 2-chloroethyl phosphonodithioate esters useful as plant growth regulators, processes for their preparation and procedures for their use.

Background of the Prior Art

Among the various materials known in the art as being plant growth regulators, 2-chloroethyl phosphonic acid has many valuable and unique properties. It has now been found that a narrow class of compounds related to 2-chloroethyl phosphonic acid, specifically certain thioesters of 2-chloroethyl phosphonic acid, have unique biological activity in that they exhibit growth regulation for increased fruiting of plants such as soy beans, pineapples and the like. While structurally similar compounds are known in the art, for example, at Chemical Abstracts, vol. 51, page 4935, which discloses S,S-dibutyl - 2 - chloroethyl phosphonodithioate, prepared from the sodium salt of the corresponding alcohol suspended in ether and 2-chloroethyl phosphonyl dichloride, such compounds have not been found to be as useful as plant growth regulators as are those of the present invention.

SUMMARY OF THE INVENTION

It is accordingly one object of this invention to provide esters of 2-chloroethyl phosphonodithioic acids.

A further object of the invention is to provide esters of 2-chloroethyl phosphonodithioic acids and processes for their preparation as well as procedures for their application to plants as plant growth regulators and stimulators.

Other objects and advantages of the present invention will become apparent as the description thereof proceeds.

In satisfaction of the foregoing objects and advantages, there are provided by this invention esters of 2-chloroethyl phosphonodithioate acids of the following formula:

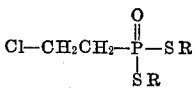

wherein R is alkyl of 1 to 2 carbon atoms, haloalkyl of 1 to 2 carbon atoms, the halo atom being chlorine, bromine, iodine or fluorine, but preferably chlorine, aryl of 6 to 12 carbon atoms, (e.g., phenyl or naphthyl), haloaryl of 6 to 12 carbon atoms, or aralkyl of 7 to 12 carbon atoms. These compounds are produced by the reaction between a 2-chloroethyl phosphonyl dihalide with a mercaptan of the formula, RSH, in the presence of an acid acceptor.

Description of Preferred Embodiments

According to this invention, there are provided certain esters of 2-chloroethyl phosphonodithioic acid which have been found to be useful as plant growth regulators for increased fruiting. These compounds are of the following structure

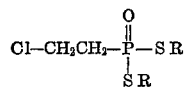

wherein in the above formula, R is alkyl of 1 to 2 carbon atoms (ethyl or methyl), haloalkyl of 1 to 2 carbon atoms, the halo atom being chlorine, bromine, iodine or fluorine but preferably chlorine, a preferred radical of this class being 2-chloroethyl, aryl of 6 to 12 carbon atoms such as phenyl or naphthyl, including alkyl substituted derivatives thereof wherein the alkyl group has 1 to 7 carbon atoms, halo-substituted aryl such as 2,3, or 4 - chlorophenyl, 2,3,4 - chloronaphthyl, 3,4 - dichlorophenyl, 3,4,5-trichlorophenyl, and the like or aralkyl of 7 to 12 carbon atoms, for example, benzyl.

The above compounds have been found to provide unexpectedly increased growth regulation properties in that they increase fruiting of plants such as pineapples, soy beans, tomatoes, small grains, and the like, and thereby increase the yields thereof. The compounds are believed to operate because of the fact that they are absorbed by the plant and release ethylene, a known plant regulator, in a form in which it can be used by the plant.

The compounds of this invention are soluble in varying degrees in water and so they can be applied to the plants in aqueous solutions composed wholly or partially of water; partial solutions include those formed of water and say acetone or methyl ethyl ketone. Any aqueous medium may be used provided that it is not toxic to the plant.

The novel compounds of the present invention in which the R groups are ethyl or methyl are particularly preferred since not only have they exhibited higher activity/g., but in addition, have relatively high solubility in water so they can be applied to plants from an aqueous medium without the necessity of any further additives and hydrolyze relatively slowly with resultant sustained or prolonged activity. The novel compounds in this invention, in which the R groups are aryl, or halo-substituted aryl, or aralkyl, have substantially less water solubility, and, in addition, hydrolyze much more rapidly. On certain plants, therefore, it may be advantageous to use a mixture of compounds, some of which are aryl, halo-substituted aryl or aralkyl in order to provide high initial hydrolysis and resultant activity and others in which R is methyl or ethyl, to provide sustained or prolonged hydrolysis and resultant activity.

In the case of those particular derivatives which have relatively slow water solubility, they may be solubilized by the use of co-solvents and the like. Also, the compounds may be adsorbed on solid carriers such as vermiculite, attaclay, talc and the like for application in granular form. Dusts may also be used in which case the active ingredients will be diluted with clays or other powders, for example pyrophyllite, diatomaceous earth and attapulgite.

The compounds of this invention can be applied to the plants at a concentration of from ½ to 10 lbs./acre or higher, dependent on the particular derivative used. A preferred rate of application ranges from 2–5 lbs./Acre. The phosphonic derivatives need only be applied to the plant in low volumes of water to achieve satisfactory initiation, and this is an important advantage of this invention. Whereas it is necessary to apply the known agents in large volumes of water, of the order of 200–400 gallons/Acre, even up to 1,000 gallons/Acre in the case of ethylene to achieve initiation, it is possible to apply a compound of this invention in far lower volumes of water to achieve satisfactory flower initiation. For example, the compounds of the present invention can be applied in 50 gallons of water at the rate of 1 lb./Acre to achieve 100% flower induction on pineapples of the Smooth Cayenne variety. The ability to apply the agent in a reduced volume of water is a great agronomic advantage because a large acreage of plantation can be treated before recourse to a water supply is necessary, smaller equipment can be used and costs can be reduced generally.

The products of this invention are prepared by reaction between one equivalent of a 2-chloroethyl phosphonyl dihalide of the following formula:

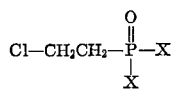

wherein X is halogen, preferably chlorine, with at least two equivalents of a mercaptan of the formula, RSH, wherein R is as defined above, in the presence of two equivalents of an acid acceptor. The acid acceptors employed are those generally known in the art such as tertiary amines, e.g., triethylamine, trimethyl amine, pyridine, etc. as well as inorganic acceptors such as alkali metal hydroxides (e.g. NaOH or KOH), alkali metal carbonates (e.g., $Na_2CO_3$), alkali metal bicarbonates ($NaHCO_3$), etc. Mixtures may also be used. Obviously any other acid acceptor known to those skilled in the art may be employed.

Suitable mercaptans which may be employed to provide the final products include ethyl mercaptan, methyl mercaptan, p-t-butylphenyl mercaptan, p-chlorophenyl mercaptan, benzyl mercaptan and the like.

The reaction is generally conducted at low temperatures and preferably in an inert solvent which has had substantially all the water removed therefrom. Preferred temperatures of operation are about −10 to 20° C. and preferably from 0–5° C. A preferred solvent for use in the invention is dried diethyl ether although other equivalent solvents may be employed, such as aromatic hydrocarbons (e.g., benzene, toluene and xylene), dioxane, and the like.

In conducting the process, the phosphorous compound in solvent solution is generally charged to a reactor and the substituted mercaptan, also in the solvent solution, added thereto followed by addition of the acid acceptor, which is preferably also added in solvent solution. After all the materials are added at the low temperatures, the reaction mixture is then permitted to warm to room temperature and agitated for a short period of time to allow the reaction to go to completion. Thereafter, the salt formed during the reaction is filtered off and the resulting filtrate distilled or otherwise processed to provide the product as a residue.

The following examples are presented to further illustrate the invention but it is not to be considered as limited thereto.

EXAMPLE 1

S,S-Diethyl 2-Chloroethylphosphonodithioate

There was charged to a reaction flask 27.3 grams (0.15 mole) of 2-chloroethylphosphonyl dichloride and 200 ml. anhydrous ether. At a temperature of 0–5° C. there was added dropwise a solution of 18.6 grams (0.3 mole) ethyl mercaptan in 50 ml. anhydrous ether followed by a solution of 30.3 grams (0.3 mole) triethylamine in 50 ml. anhydrous ether. After stirring at room temperature for one hour, the amine hydrochloride was filtered off and washed with ether. The filtrate was freed of solvent by flash evaporation to yield a residue of 33.7 grams. This product was distilled under vacuum. A 17.2 gram fraction of clear liquid boiling at 82–85° C. under 0.05 mm. pressure was collected.

| Analysis | Calcd. | Found |
|---|---|---|
| $C_6H_{14}ClOPS_2$ (percent): | | |
| Cl | 15.27 | 14.88 |
| S | 27.5 | 27.31; 27.25 |

EXAMPLE 2

S,S-Diphenyl 2-Chloroethylphosphonodithioate

A solution of 18.2 grams (0.1 mole) 2-chloroethylphosphonyl dichloride in 150 ml. dry ether was cooled to a temperature of 5° C. and at 0–5° C., there was added a solution of 22.0 grams (0.2 mole) phenylmercaptan and 20.2 grams (0.2 mole) triethylamine in 150 ml. dry ether. After stirring 1 hour at room temperature the hydrochloride was removed by filtration and washed with ether. Flash evaporation of the filtrate to constant weight yielded 25.9 grams of product, a white crystalline solid.

EXAMPLE 3

S,S-Di-(p-tert-butylphenyl)-2-Chloroethylphosphonodithioate

In a manner similar to Example 2 above the same molar quantities of 2-chloroethylphosphonyl dichloride and triethylamine were reacted with 33.2 grams (0.2 mole) p-tert-butylphenylmercaptan to yield a white crystalline product, S,S-di-(p-tert-butylphenyl) - 2 - chloroethylphosphonodithioate.

EXAMPLE 4

S,S-Di-(p-chlorophenyl)-2-Chloroethylphosphonodithioate

In a manner similar to Example 2 the product from p-chloro-phenylmercaptan and 2-chloroethylphosphonyl dichloride was obtained. This compound had the following formula:

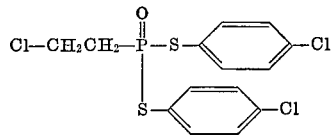

EXAMPLE 5

S,S-Di-(p-methylphenyl)-2-Chloroethylphosphonodithioate

In a manner similar to Example 2, the reaction of p-toluenethiol and 2 - chloroethylphosphonyl dichloride yielded S,S-di-(p - methylphenyl) - 2 - chloroethylphosphonodithioate.

The invention has been described herein with reference to certain preferred embodiments but obvious variations thereon will become obvious to those skilled in the art.

What is claimed is:

1. An ester of 2-chloroethyl phosphonodithioic acid of the formula:

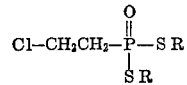

wherein R is alkyl of 1 to 2 carbon atoms, haloalkyl of 1 to 2 carbon atoms, aryl of 6 to 12 carbon atoms, halo-substituted aryl of 6 to 12 carbon atoms, $C_{1-7}$ alkyl-substituted aryl of 6 to 12 carbon atoms or aralkyl of 7 to 12 carbon atoms.

2. An ester according to claim 1 wherein R is ethyl.
3. An ester according to claim 1 wherein R is 2-chloroethyl.
4. An ester according to claim 1 wherein R is phenyl.
5. An ester according to claim 1 wherein R is tertiary-butyl-phenyl.
6. An ester according to claim 1 wherein R is p-chlorophenyl.
7. An ester according to claim 1 wherein R is benzyl.
8. An ester according to claim 1 wherein R is p-methylphenyl.

References Cited

UNITED STATES PATENTS

| 3,294,876 | 12/1966 | Regel | 260—961 X |
| 3,094,405 | 6/1963 | Toy et al. | 260—961 X |

FOREIGN PATENTS

| 1,558,691 | 2/1969 | France. |

OTHER REFERENCES

Shepeleva et al., Chemical Abstracts, vol. 51, p. 4934 (1957).

ANTON H. SUTTO, Primary Examiner

U.S. Cl. X.R.

71—87